W. P. LOUDON.
CELL POST AND METHOD OF MOUNTING SAME.
APPLICATION FILED JAN. 26, 1918.

1,362,018.

Patented Dec. 14, 1920.

WITNESS:

INVENTOR.
Warren P. Loudon
BY
ATTORNEY.

UNITED STATES PATENT OFFICE.

WARREN P. LOUDON, OF NIAGARA FALLS, NEW YORK, ASSIGNOR TO U. S. LIGHT & HEAT CORPORATION, OF NIAGARA FALLS, NEW YORK, A CORPORATION OF NEW YORK.

CELL-POST AND METHOD OF MOUNTING SAME.

1,362,018.  Specification of Letters Patent.  Patented Dec. 14, 1920.

Application filed January 26, 1918. Serial No. 213,859.

*To all whom it may concern:*

Be it known that I, WARREN P. LOUDON, a citizen of the United States, residing at Niagara Falls, in the county of Niagara and State of New York, have invented new and useful Improvements in Cell-Posts and Methods of Mounting Same, of which the following is a specification.

The present invention relates to cell posts and method of mounting same.

More particularly the present invention relates to construction in storage battery cells whereby an electric conductor may extend out from the interior of the cell without resulting in the escape of the electrolyte around said conductor. The invention also relates to the method of sealing said conductor to the cell whereby the escape of the electrolyte will be prevented.

An object of the present invention is to provide an improved construction of cell post which may be tightly secured to the cover or other part of the storage battery cell through which said cell post extends, to prevent the electrolyte from creeping along said cell post to the exterior of the cell.

A further object is to provide a cell post construction which is effectual in operation, simple in construction and cheap to assemble.

A further object is to provide a new and improved method of uniting the cell post to the cover or other part of the storage battery cell.

Referring to the drawings:—

Figure 1:
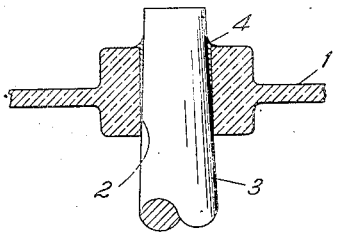
Figure 1 represents one embodiment of the present invention.

Referring first to Fig. 1, the numeral 1 indicates the cover or other portion of a storage battery cell. Said part 1 is provided with an aperture extending therethrough which is indicated by the numeral 2. The numeral 3 indicates a cell post. The cell post 3 may be of tapered configuration and the angle of said taper may be greater than the angle of taper of the aperture 2 whereby the cell post 3 may serve as an abutment against which the part 1 may rest. When the post 3 is mounted within the aperture 2, a coating 4 of lead or any suitable metal, will be applied to the post 3 and the surrounding surface of the part 1. The lead or other metal referred to may be applied by projecting the same in a finely divided state at a high velocity. Said method of plating articles with a metallic substance is well known and needs no explanation herein. The coating of lead or other metal may be extended down the post for a short distance within the aperture 2, if such construction should be desired. The coating 4 of lead or other metal will be firmly united to the cell post and will also be firmly united to the part 1, whereby to effectually prevent the passage of electrolyte between said post and said part 1.

Figure 2:
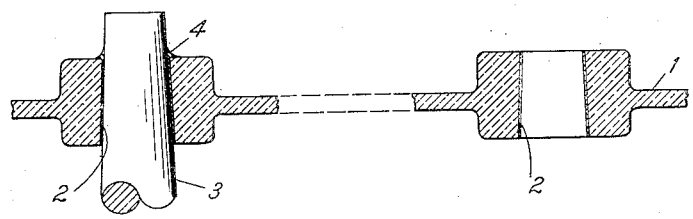
Fig. 2 represents a modification.

In Fig. 2 the cover or other part 1 of the storage battery cell is represented with the two apertures which are commonly provided. The cell post is omitted from the right hand aperture 2 for the purpose of illustrating the construction. In building up the construction according to the disclosure in Fig. 2, the walls of the aperture 2 will be plated with lead or other metal, in the manner above referred to. The cell post 3 should fit within the taper of the aperture 2. The operator in assembling the cell post within the part 1 will plate the upper part of the part 1 around the cell post and the cell post itself with a coating of lead or other metal, in the manner above referred to, whereby to form an effectual seal. It will be obvious that the coating within the aperture 2 of Fig. 2 may be omitted, if desired, the cell post and the part 1 being sealed together by means of the coating on the upper side of the part 1.

The described embodiments of the present invention are chosen merely for the purpose of illustration. Many modifications will occur to those skilled in the art. It is intended in this patent to cover all such modifications that fall within the scope of the present invention as defined by the appended claims.

What I claim as new and desire to secure by Letters Patent of the United States is:—

1. In a battery cell, in combination, a cell wall provided with an aperture, a cell post mounted in said aperture, and means for preventing the creepage of electrolyte along said cell post to the exterior of said cell, comprising a metallic coating on said cell post and the adjacent area of said wall.

2. The method of uniting a cell post to a wall of a storage battery cell which consists in mounting said cell post in an aperture in said wall and applying a metallic coating to said post and to the adjacent surface of said wall.

3. The method of uniting a cell post to a part of a storage battery cell which consists in mounting said post in an aperture in said part and spraying metal in a finely divided state upon said post and the adjacent surface of said part to apply a coating to unite said post and said part.

In witness whereof, I have hereunto subscribed my name.

WARREN P. LOUDON.